United States Patent
Garvey

(10) Patent No.: US 11,552,860 B2
(45) Date of Patent: *Jan. 10, 2023

(54) SYSTEM AND METHOD FOR VISUALIZING AND NAVIGATING NETWORK DATA

(71) Applicant: Robert Brennan Garvey, Country Club, MO (US)

(72) Inventor: Robert Brennan Garvey, Country Club, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/880,741

(22) Filed: Aug. 4, 2022

(65) Prior Publication Data

US 2022/0376991 A1 Nov. 24, 2022

Related U.S. Application Data

(63) Continuation of application No. 17/548,311, filed on Dec. 10, 2021, now Pat. No. 11,438,241, which is a continuation of application No. 16/725,432, filed on Dec. 23, 2019, now Pat. No. 11,233,705.

(51) Int. Cl.
*G06F 16/00* (2019.01)
*H04L 41/22* (2022.01)
*H04L 41/12* (2022.01)
*G06F 16/901* (2019.01)

(52) U.S. Cl.
CPC .......... *H04L 41/22* (2013.01); *G06F 16/9024* (2019.01); *G06F 16/9027* (2019.01); *H04L 41/12* (2013.01)

(58) Field of Classification Search
None
See application file for complete search history.

(56) References Cited

U.S. PATENT DOCUMENTS

| | | | |
|---|---|---|---|
| 7,203,701 | B1 | 4/2007 | Packebush |
| 7,782,798 | B2 | 8/2010 | Xu |
| 7,831,689 | B2 | 11/2010 | Poisson |
| 3,014,320 | A1 | 9/2011 | Farkas |
| 9,160,624 | B2 | 10/2015 | Swenson |
| 2002/0048263 | A1 | 4/2002 | Fieremans |
| 2002/0113816 | A1 | 8/2002 | Mitchell |
| 2005/0071312 | A1 | 3/2005 | Chau |

(Continued)

OTHER PUBLICATIONS

Kaur et al. "XML Parsing on Multicore Processors and Data Representation in .NET Tree Control", International Journal of Computer Applications, vol. 99, Aug. 2014, pp. 29-35.

(Continued)

*Primary Examiner* — Maikhanh Nguyen
(74) *Attorney, Agent, or Firm* — Fresh IP PLC; John R. Bednarz

(57) ABSTRACT

A system for visualizing and navigating network data may include at least one computing device that receives input data using a NetTree application. The NetTree application may parse the input data and determine a list of nodes in a network and a list of links between nodes in the network from the input data. One of the nodes may be selected as a start node and inserted into a line of a network tree. After selecting the start node, the NetTree application may iterate through each of the links between the nodes in the network and add each new node that is not yet added to the network tree to a list of nodes to check for their links. Each link is added to a line in the network tree. A graphical user interface (GUI) may display the network tree.

18 Claims, 12 Drawing Sheets

(56) References Cited

U.S. PATENT DOCUMENTS

| | | |
|---|---|---|
| 2005/0071347 A1 | 3/2005 | Chau |
| 2006/0168205 A1 | 7/2006 | Barron |
| 2007/0160039 A1 | 7/2007 | Xu |
| 2007/0198678 A1 | 8/2007 | Dierberget |
| 2008/0270529 A1 | 10/2008 | Cavagna |
| 2009/0063708 A1 | 3/2009 | Sultan |
| 2010/0022752 A1 | 1/2010 | Young |
| 2010/0135186 A1 | 6/2010 | Choong |
| 2010/0149983 A1 | 6/2010 | Lee |
| 2014/0012963 A1 | 1/2014 | Swenson |
| 2020/0210482 A1 | 7/2020 | Becker |

OTHER PUBLICATIONS

Wieselthier et al. "On the Consruction of Energy-Efficient Broadcast and Multicast Trees in Wireless Networks", 2000 IEEE, pp. 585-594.

Reutelshoefer, et al. "A Data Structure for the Refactoring of Multimodal Knowledge", Institute for Computer Science, University of Wurzburg, Germany, 2009, 13 pages.

Yang, et al. "PIWI: Visually Exploring Graphs Based on Their Community Structure", Journal of Latex Class Files, vol. 6, No. 1, Jan. 2007, IEEE, Aug. 16, 2012, 14 Pages.

Chhabra, et al. "Entity-centric—Summarization: Generating Text Summaries for Graph Snippets", Indraprastha Institute of Information Technology, New Delhi, India, Apr. 7, 2014, 5 pages.

Roberts, et al, "Augmented Textual Data Viewing in 3D Visualizations Using Tablets", Media Arts and Technology Program UC Santa Barbara, Mar. 4, 2012, 4 pages.

Wattenberg, et al., "The Word Tree, an Interactive Visual Concordance", Mar. 31, 2008, 8 pages.

"A Genealogy Report for Patrick Joseph Kennedy", Nov. 6, 2018, The Complete Genealogy Reporter, Nigel Button Software, 33 pages.

Chen, Peter P. "Entity-Relationship Modeling: Historical Events, Future Trends, and Lessons Learned", Computer Science Department, Louisiana State University, Baton Rouge, LA, 2002, 11 pages.

Jagadish et al. "Balon: A balanced tree structure for peer-lo-peer networks." Jan. 2006, pp. 1-9.

Dai. "A New Implementation of Clustering Algorithm and its Application in Net-tree Construction Algorithm." Diss. Miami University, 2009, pp. 1-39.

International Search Report and Written Opinion, PCT/US2020/064829, dated Mar. 17, 2021, 22 pages.

Notice of Allowance and Fees Due, dated Nov. 30, 2021, issued in U.S. Appl. No. 16/725,432; 18 pages.

Notice of Allowance and Fees Due, dated Jun. 30, 2022, issued in U.S. Appl. No. 17/548,311; 25 pages.

```
> Ξ Albert
   < ^ Ξ Edward -> Sits By (Candice)
 - Ξ Candice <- Plays cards with (Albert)
    - Ξ Florence <- Likes (Candice)
       ^ Ξ Izzy <- Lives By (Florence)
    - Ξ George <- Sits by (Candice)
       Ξ Izzy <- Lives by (George)
 - Ξ Ben <- Cooks for (Albert)
    - Ξ Dwight <- Swims with (Ben)
       < ^ Ξ Florence -> Likes (Edward)
    - Ξ Edward <- Coaches (Ben)
       < ^ Ξ Izzy -> Cooks for (Helen)
       Ξ Helen <- Likes (Edward)
```

SYSTEM AND METHOD FOR VISUALIZING AND NAVIGATING NETWORK DATA

CROSS-REFERENCE TO RELATED APPLICATIONS

This application is a continuation of U.S. application Ser. No. 17/548,311, entitled "System and Method for Visualizing and Navigating Network Data," filed Dec. 10, 2021, which is a continuation of U.S. application Ser. No. 16/725,432, entitled "System and Method for Visualizing and Navigating Network Data," filed Dec. 23, 2019, the disclosure of which is hereby incorporated herein by reference.

BACKGROUND

Conventional graph applications are limited when it comes to modeling the relationships between objects. The current state of the art almost exclusively relies upon presenting graphical displays of network data. The graphical displays are typically limited to drawn graphs and may only present nodes and fail to indicate properties.

In addition, relationships may be modeled using a drawn graph. However, drawn graphs have a number of limitations and are unable to easily represent complex systems such as a dense system having high order nodes and links. The drawn graph may not be used to indicate parentage or superiority of one entity over another and there may not be a starting point. Even further, a drawn graph may require a large amount of space and it may be difficult to understand relationships between entities as a number of relationships increase.

It is with these issues in mind, among others, that various aspects of the disclosure were conceived.

SUMMARY

According to one aspect, a system for visualizing and navigating network data may include at least one computing device that receives input data using a NetTree application. The NetTree application may parse the input data and determine a list of nodes in a network and a list of links between nodes in the network from the input data. One of the nodes may be selected as a start node or a top node and inserted into a line of a network tree. After selecting the start node, the NetTree application may iterate through each of the links between the nodes in the network and add each new node that is not yet added to the network tree to a list of nodes to check for their links. Each link is added to a line in the network tree. After iterating through each link between the nodes in the network tree and inserting each link in the list of lines into the network tree, the NetTree may display the network tree using a graphical user interface (GUI). A user may manipulate the network tree and interact with the network tree by selecting user interface elements to view information associated with each line of the network tree. As an example, each line may have associated properties that may be displayed such as a name or value of each node and a name or value of each link. The graphical user interface may use color and/or white space such as indentions to indicate an organization of each of the nodes and each of the links of the network tree. As an example, the start node may be displayed using a first color and each other node may be displayed using a second color or a third color.

According to an aspect, a system includes a memory and at least one processor to execute instructions stored by the memory to receive input data, determine a list of nodes in a network from the input data, and determine a list of links between the list of nodes in the network from the input data, set a level equal to zero, select a node from the list of nodes in the network to be a start node of a network tree and insert the start node in a current line of the network tree, and increment the level by one, based on the level of the network tree, checking each link in the list of links between the nodes in the network having at least one node at the level of the network tree, based on the level of the network tree, for each link in the list of links between the nodes in the network having the at least one node, perform one of insert the link in a new line below the current line in the network tree when the at least one node is a left node in the link and insert the link in a new line above the current line in the network tree when the at least one node is a right node in the link, and remove the link from the list of links to add to the network tree, and after adding each link in the list of links between nodes in the network tree, display the network tree in a graphical user interface.

According to another aspect, a method includes receiving, by at least one processor, input data, determining a list of nodes in a network from the input data, and determining a list of links between the list of nodes in the network from the input data, setting, by the at least one processor, a level equal to zero, selecting a node from the list of nodes in the network to be a start node of a network tree and inserting the start node in a current line of the network tree, and incrementing the level by one, based on the level of the network tree, checking, by the at least one processor, each link in the list of links between the nodes in the network having at least one node at the level of the network tree, based on the level of the network tree, for each link in the list of links between the nodes in the network having the at least one node, performing, by the at least one processor, one of inserting the link in a new line below the current line in the network tree when the at least one node is a left node in the link and inserting the link in a new line above the current line in the network tree when the at least one node is a right node in the link, and removing the link from the list of links to add to the network tree, and after adding each link in the list of links between nodes in the network tree, displaying, by the at least one processor, the network tree in a graphical user interface.

According to an additional aspect, a non-transitory computer-readable storage medium includes instructions stored thereon that, when executed by a computing device cause the computing device to perform operations, the operations including receiving input data, determining a list of nodes in a network from the input data, and determining a list of links between the list of nodes in the network from the input data, setting a level equal to zero, selecting a node from the list of nodes in the network to be a start node of a network tree and inserting the start node in a current line of the network tree, and incrementing the level by one, based on the level of the network tree, checking each link in the list of links between the nodes in the network having at least one node at the level of the network tree, based on the level of the network tree, for each link in the list of links between the nodes in the network having the at least one node, performing one of inserting the link in a new line below the current line in the network tree when the at least one node is a left node in the link and inserting the link in a new line above the current line in the network tree when the at least one node is a right node in the link, and removing the link from the list of links to add to the network tree, and after adding each link in the list of links between nodes in the network tree, displaying the network tree in a graphical user interface.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
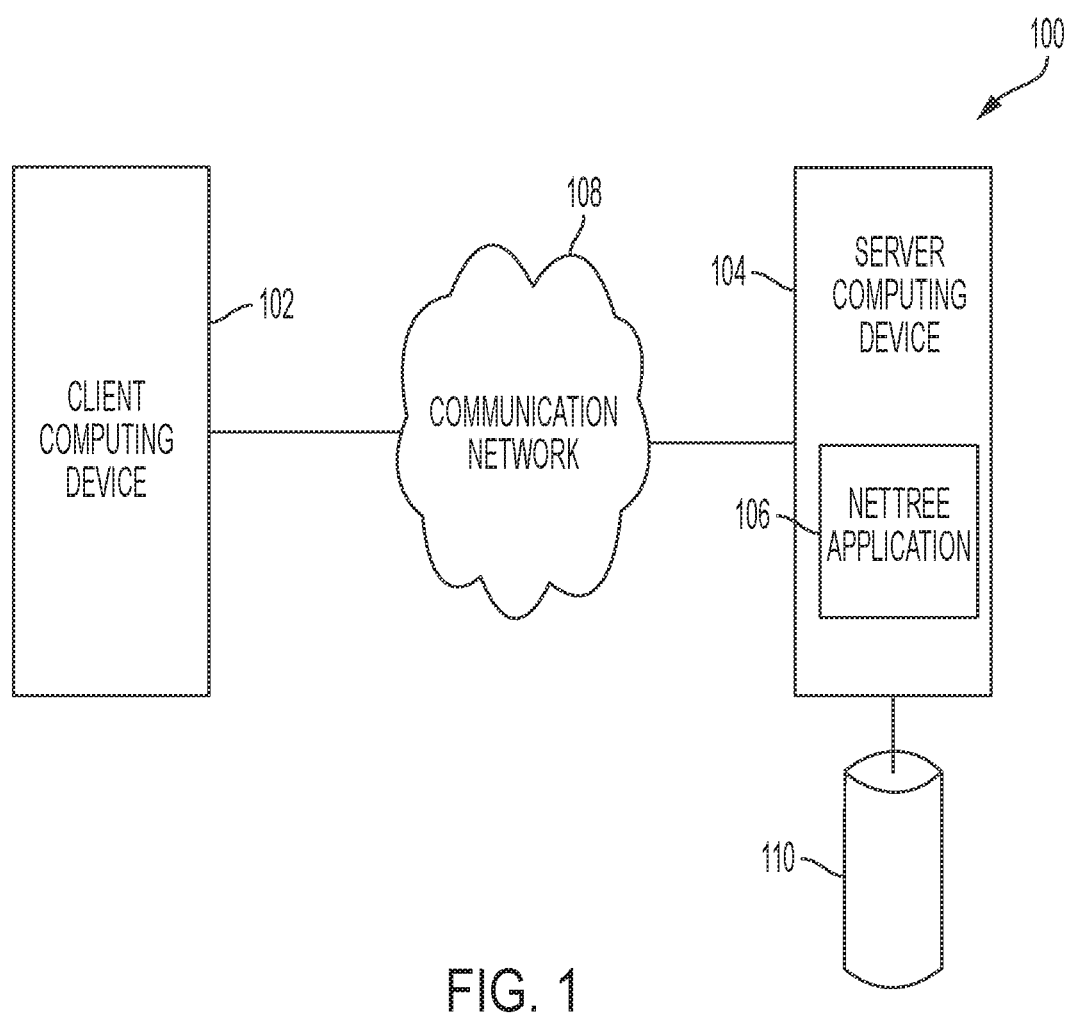
FIG. 1 is a block diagram of a system for visualizing and navigating network data according to an example embodiment.

Aspects of a system and method for visualizing and navigating network data may include a client computing device that sends input data to a server computing device having a NetTree application. The NetTree application provides automated network data manipulation and display.

In one example, the server computing device and the client computing device may be the same computing device. Alternatively, the server computing device and the client computing device may be separate computing devices.

The NetTree application receives the input data and parses the input data to determine a list of nodes in a network and a list of links between nodes in the network from the input data. As an example, the input data may be based on an input graph file such as a text file including a .gv file, a .gml file, a .gexf file, a .dot file, or a GEDCOM file, among others. Thus, the input data may be formatted in the input graph file in a particular way. In one example, the input data may be formatted in an Extensible Markup Language (XML) format or another format. In another example, input may be provided to a graphical user interface that may permit entry into each of the tables of the data structure. As an example, the user may enter the name of a network tree, properties of the network tree (or select from a template of network tree properties), nodes and node properties, and links and link properties. Also, data can be obtained from a graph database such as Neo4j, Maria, and tinkerpop, among others.

A graph may include vertices, nodes, or points and edges, links, or lines that connect the vertices, nodes, or points. The system discussed herein applies network theory, which is an extension of graph theory by adding properties to elements of a network. The system discussed herein is able to succinctly display extremely complicated network trees that illustrate the nodes as well as the links between the nodes at the same time as properties associated with the nodes and the links of the network tree. The system is able to display both directed graphs (digraphs) and undirected graphs. A directed graph, G=(V,E), is defined by a set and a collection: a finite set, V, of elements (also referred to as "nodes") and a finite collection, E, of elements of ordered pairs of nodes (also referred to as "edges"). Each ordered pair of nodes comprises an initial node and a terminal node. With directed graphs, an edge is "incident out of" its initial node and is "incident into" its terminal node.

The system may present or display the links between any arbitrary network in a tree-like fashion relating each link to other links that share nodes. The system may present or display the network tree using visual cues (e.g., white space, tabs, or indentions) that may indicate a distance of each node to a start node or a root node. In addition, properties associated with the network tree, nodes, and links may be presented at the same time with the nodes and the links of the network tree. The network tree may be displayed as one or more lines that show each of the one or more nodes of the network tree and the one or more links of the network tree. Each line may be selected by a user. When selected, properties and/or details associated with the selected link and nodes of the selected link may be displayed.

The system for visualizing and navigating network data declutters the presentation of networks or graphs and produces a textual and/or graphical representation of a network or graph as a network tree that shows relationships and properties that can be displayed. Although a graph or network may be very dense and very complicated, the system is able to present data associated with the network or graph in an informative and attractive way.

The system may receive the input comprising data that represents a network or graph and convert the input into output that is easy to view, manipulate, and understand. The input may be data that represents a network, graph, or tree. The output may be a presentation of the network, graph, or tree that shows how each node relates to each node in the graph and associated properties of nodes and links between nodes. Thus, the system is able to succinctly show a complicated network or graph that includes a network of data, nodes in the network, and links between nodes in the network including properties.

The system may include a NetTree application that may be a software application such as a web application executed by a server computing device. A client computing device may have a browser application that communicates data and information with the server computing device and displays a graphical user interface (GUI) provided by the NetTree application. The user of the client computing device may provide input data to the server computing device executing the NetTree application. The NetTree application may receive the input data, instantiate and populate a unique data structure with the input data, and generate output comprising the GUI with the presentation of a network tree that shows how each node relates to each node in the network tree. Alternatively, there may be no server computing device and the NetTree application may be executed locally by a single computing device.

The NetTree application may utilize a unique data structure known as a NetTree data structure that is discussed further herein. The NetTree data structure may allow for representation of a complicated network tree using the GUI with colors and spacing such as indention or white space. The indention may indicate a distance or level to a start node. As an example, the start node may be displayed using a first color and each other node may be displayed using a second color. In addition, properties associated with the network, nodes, and links may be presented on each line and may be selectable by the user to provide additional information such as text and/or images. The additional information may be provided using a pop-up user interface element or another type of user interface element.

NetTree may be used to provide benefits in a variety of different disciplines and areas of interest including, but not limited to, file systems, genealogy, graph theory, brain storming, ontology, information technology analysis, network management, genomics, genetics, project management, chemistry, social networking, processing mapping, artificial intelligence, management, taxonomy, case tools, relational databases, meal preparation, bioinformatics, strategic planning, concept maps, and knowledge maps. As an example, NetTree may be able to display a family tree and show information associated with ascendency and descendancy.

The server computing device may include a memory and at least one processor to execute instructions stored by the memory to receive input data, determine a list of nodes in a network from the input data, and determine a list of links between the list of nodes in the network from the input data, set a level equal to zero, select a node from the list of nodes in the network to be a start node of a network tree and insert the start node in a current line of the network tree, and increment the level by one, based on the level of the network tree, checking each link in the list of links between the nodes in the network having at least one node at the level of the network tree, based on the level of the network tree, for each link in the list of links between the nodes in the network having the at least one node, perform one of insert the link in a new line below the current line in the network tree when the at least one node is a left node in the link and insert the link in a new line above the current line in the network tree when the at least one node is a right node in the link, and remove the link from the list of links to add to the network tree, and after adding each link in the list of links between nodes in the network tree, display the network tree in a graphical user interface.

Even further, based on the level of the network tree, when the left node of the link is a node that has not been checked for each link in the list of links between the nodes in the network having the at least one node, the processor may add the left node to the at least one node in the list of nodes in the network tree at the level plus one of the network tree that has not been checked for each link in the list of links between the nodes in the network having the at least one node and based on the level of the network tree, when the right node of the link is a node that has not been checked for each link in the list of links between the nodes in the network having the at least one node, and add right node to the at least one node in the list of nodes in the network tree at the level plus one of the network tree that has not been checked for each link in the list of links between the nodes in the network having the at least one node, and increment the level of the network tree.

FIG. 1 shows a block diagram of a computing system comprising a network tree visualization system 100 according to an example embodiment. The network tree visualization system 100 includes at least one client device 102 that is in communication with at least one server computing device 104 via a communication network 108. The at least one server computing device 104 may have an application or at least one component of an application shown as a NetTree application 106.

The at least one client computing device 102 is configured to receive data from and/or transmit data to the at least one server computing device 104 through the communication network 108. Although the at least one client device 102 is shown as a single computing device, it is contemplated that the at least one client computing device 102 may include multiple computing devices.

The communication network 108 can be the Internet, an intranet, or another wired or wireless communication network. For example, the communication network 108 may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a satellite communications network, or an IEEE 802.11 standards network, as well as various communications thereof. Other conventional and/or later developed wired and wireless networks may also be used.

The at least one client computing device 102 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or component of the NetTree application 106. In addition, the at least one client computing device 102 further includes at least one communications interface to transmit and receive communications, messages, and/or signals.

The at least one server computing device 104 includes at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions such as a portion or a component of the NetTree application 106. In addition, the at least one server computing device 104 further includes at least one communications interface to transmit and receive communications, messages, and/or signals.

The at least one client computing device 102 can be a laptop computer, a smartphone, a personal digital assistant, a tablet computer, a standard personal computer, or another processing device. The at least one client computing device 102 may include a display, such as a computer monitor, for displaying data and/or graphical user interfaces. The at least one client computing device 102 may also include a Global Positioning System (GPS) hardware device for determining a particular location of the client computing device 102, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The at least one client computing device 102 may display on the display a graphical user interface (or GUI). The graphical user interface may be provided by the NetTree application 106. The graphical user interface enables a user of the at least one client computing device 102 to interact with the NetTree application 106 and produce a textual and/or graphical representation of a network that shows relationships and properties that can be displayed.

The NetTree application 106 may be a component of an application and/or service executable by the at least one server computing device 104. For example, the NetTree application 106 may be a single unit of deployable executable code or a plurality of units of deployable executable code. According to one aspect, the NetTree application 106 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The network tree visualization system 100 may also include a relational database management system (RDBMS) or another type of database management system such as a NoSQL database system that stores and communicates data from at least one database 110. The data stored in the at least one database 110 may be associated one or more network trees. As an example, each network tree may have a list of nodes, a list of links between the nodes, and at least one property associated with the network tree including each node and each link. Each network tree may be based on a NetTree data structure. As an example, the database 110 may include one or more tables or data structures that may be organized to store the information associated with the database 110.

Figure 2:
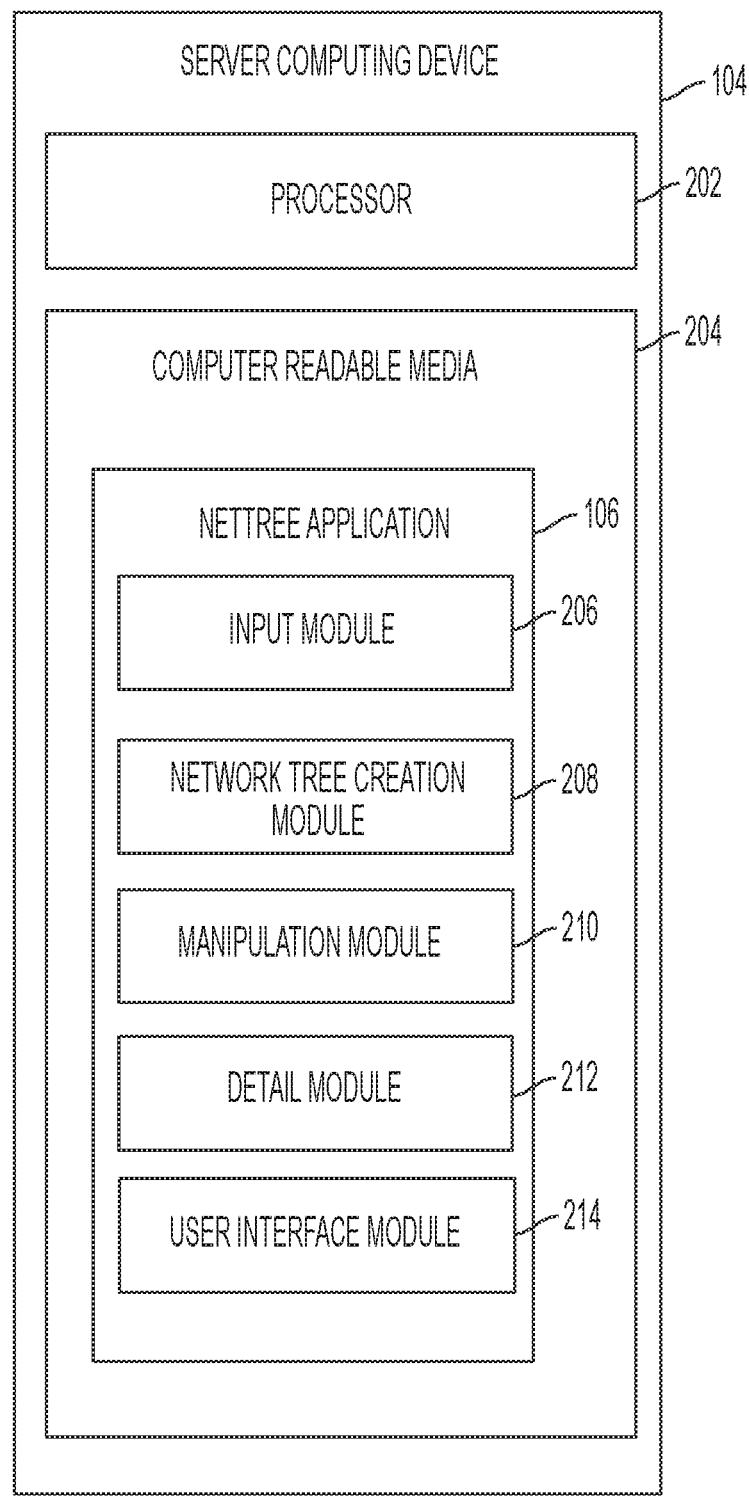
FIG. 2 shows a block diagram of a server computing device of the system according to an example embodiment.

FIG. 2 illustrates a block diagram of the server computing device 104 according to an example embodiment. The server computing device 104 includes at least one processor 202 and computer readable media (CRM) 204 in memory on which the NetTree application 106 or other user interface or application is stored. The computer readable media may include volatile media, nonvolatile media, removable media, non-removable media, and/or another available medium that can be accessed by the processor. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The NetTree application 106 may include an input module 206 for receiving input data such as network information associated with one or more networks. As an example, the input data may be based on an input graph file such as a text file including a .gv file, a .gml file, a .gexf file, a .dot file, or a GEDCOM file, among others. Thus, the input data may be formatted in the input graph file in a particular way. In one example, the input data may be formatted in an XML format or another format. In another example, input may be provided to a graphical user interface that may permit entry into each of the tables of the data structure. As an example, the user may enter the name of a network tree, properties of the network tree (or select from a template of network tree properties), Nodes and node properties and links and link properties. Also, data can be obtained from a graph database such as Neo4j, Maria, and tinkerpop, among others. The input module 206 may receive the input data and store the input data in the database 110 and/or the memory of the server computing device 104.

Figure 4:
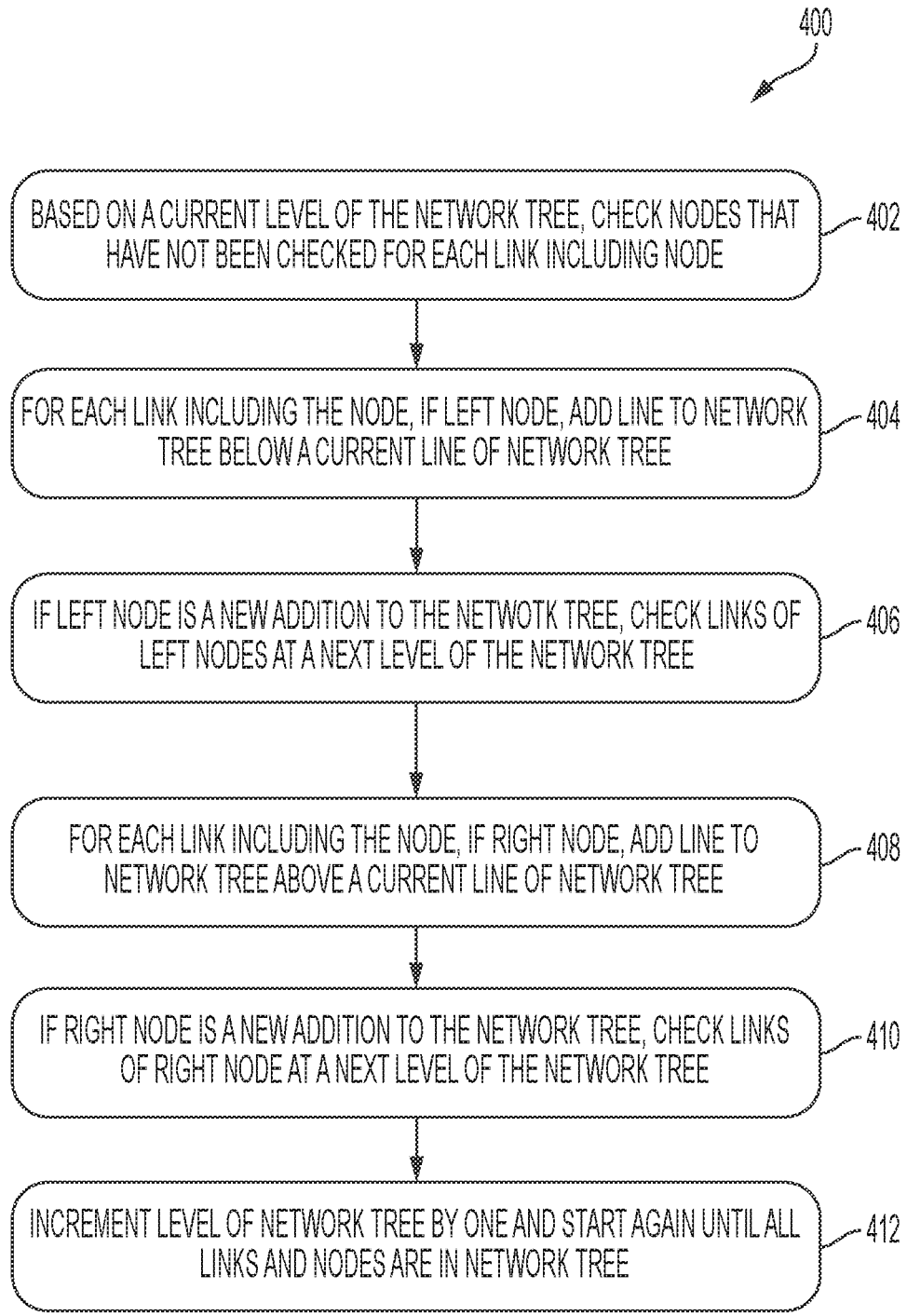
FIG. 4 illustrates details of a particular step of the process for visualizing and navigating network tree data according to an example embodiment.

The NetTree application may include a network tree creation module 208 for creating a network tree based on the input data. As an example, the network tree creation module 208 may instantiate a NetTree data structure that represents the network as shown in FIG. 4. The network tree may be based on one or more nodes in the network and one or more links between the one or more nodes in the network. The network tree may have one or more properties. In addition, each node of the one or more nodes may have one or more properties and each link of the one or more links may have one or more properties.

The network tree creation module 208 may select a first node from the one or more nodes in the network not yet added to the network tree. Alternatively, a user may select one of the nodes from the list of nodes. The first node may be used as a start node that represents a top level of the network tree. This top level has a level of zero. The level is incremented by one and the first node is checked for links.

Based on a current level of the network tree, if there are nodes in the list of nodes that have not been checked for each of its links at the current level of the network tree, the network tree creation module 208 checks a next node in the list of nodes. For this next node, the network tree creation module 208 checks each of the links in the list of links that are not yet added to the network tree. Next, each of the links not yet added to the network tree is checked in the list of links between nodes in the network and if there is a link with a left node that is equal to the current node being added to the network tree, then a line representing the link is added to the network tree below a current line in the network tree. The link is noted as being added to the network tree and removed from the list of links between nodes in the network tree. If the left node of the link added to the line is a new addition to the network tree and has not been checked for each of its links, it is added to a list of nodes to be added to be checked when the level of the network tree is incremented by one. The node is removed from the list of nodes to add to the network tree.

In addition, each of the links not yet added to the network tree is checked in the list of links between nodes in the network and if there is a link with a right node that is equal to the current node being added to the network tree, then a line representing the link is added to the network tree above a current line in the network tree. The link is noted as being added to the network tree and removed from the list of links between nodes in the network tree. If the right node of the link added to the line is a new addition to the network tree and has not been checked for each of its links, it is added to the list of nodes to be checked when the level of the network tree is incremented by one. The node is removed from the list of nodes to add to the network tree. At this point, the level of the network tree is incremented by one.

If there are nodes that are in the list of nodes to be checked for each of its links, the process begins again until each of the nodes and each of the links is added to the network tree. After adding all the lines to the network tree, the network tree is displayed in a graphical user interface and the user may select each node, link, and property of the network tree. The start node is shown on a particular line of the network tree and the other nodes are shown on other lines of the network tree based on their level. When selected, more information may be displayed for the user such as information associated with properties. As a result, the network tree may represent a linked list of lines, where each line represents a link in the network tree plus a first line to represent the start node.

As discussed in the pseudocode below, the network tree creation module 208 uses data structures to affect the algorithm's execution.

Step 1: A searchable list: nodesNotPresented contains the nodes of the network which have not been presented. A searchable list: linksNotPresented contains the links of the network which have not been inserted into the lines list. A linked list of lines contains the lines, each line representing a link in the network plus a unique line to represent the start node(s). A searchable list: nodeLevelPairs each composed of a nodeid and a level (distance) from the start node. An integer 'level' indicating the distance from the start node. A nodeLevelPair named currentNodeLevel is the current NodeLevel pair used in the execution. A link: linkhold is the current link being examined as the linksNotPresented are traversed.

Step 2: Initially nodesNotPresented is loaded with the set of nodes and linksNotPresented is loaded with the links. The integer level is set to 0.

Step 3: An initial nodeLevel pair is created by either randomly selecting a node from the nodesNotPresented list or by a user supplying a node by nodeid. A special line is created and added to lines list as the "start" line at level 0. The level is now incremented by 1, now 1. A nodeLevelPair is added to the nodeLevelPairs list with the start node and level=1.

Step 4: if (more nodesNotPresented) go to step 5, otherwise go to step 8.

Step 5: if (more nodeLevelPairs) go to step 6, otherwise go to step 4.

Step 6: if (more nodeLevelPairs.level==level) go to step 7, otherwise add 1 to level go to step 4.

Step 7: set the currentNodeLevel=getNext(nodeLevelPairs.level==level),
nodeLevelPairs.delete(currentNodeLevel) go to step 8

Step 8: forAll (linksNotPresented as linkhold) {
Step 8a: if (linkhold.LeftNode==currentNodeLevelPair.node) do the following otherwise go to step 8b.
lines.addBelow(level, linkhold, "below")
linksNotPresented.delete(linkhold)
Step 8a1: if (NodesNotPresented.contains(linkhold.LeftNode) do the following otherwise go to step 8b.
nodeLevelPairs.add(linkhold.LeftNode, level+1)
nodesNotPresented.delete(linkhold.LeftNode)
Step 8b: if (linkhold.RightNode==currentNodeLevelPair.node) do the following
lines.addAbove(level, linkhold, "above")
linksNotPresented.delete(linkhold)

Step 8b1: if (nodesNotPresented.contains(linkhold.RightNode) do the following
nodeLevelPairs.add(linkhold.RightNode, level+1)
nodesNotPresented.delete(linkhold.RightNode)
Step 8c: if (linksNotPresented has a next link get next and go to Step 8, otherwise go to step 4

Step 9: if (more nodesNotPresented) pick a node from nodesNotPresented as start node and go to step 3 otherwise go to step 10.

Step 10: Display lines list in its order from top to bottom

The NetTree application 106 includes a manipulation module 210 for allowing a user to manipulate and interact with the network tree. As an example, the network tree may be displayed by the client computing device 104 and the user may select one or more lines in the network tree by selecting a user interface element that may be associated with one or more of the lines of the network tree. As an example, the line may include a details user interface element, an arrow user interface element that indicates that there is a link in the direction of the arrow, a user interface element that indicates that a node appears in more than one location in the network tree, and an expansion/contraction user interface element that allows the user to expand and/or contract a subset of the network tree at that line.

The NetTree application 106 includes a detail module 212 for allowing a user to display detail associated with one of a node, a link, and the network tree. As an example, a user may select a particular node or link of the network tree. The detail module 212 may retrieve and display detail information associated with the particular node or link. In one example, the detail module 212 may display properties associated with the particular node or link. In one example, the properties may be displayed as a modal user interface element or pop-up user interface element that is displayed by the GUI.

The link may be Florence→Likes (Edward). If the user selects the line that displays the link between the two nodes Florence and Edward, the properties user interface element may indicate that the left node is Florence and the right node is Edward. In addition, the properties user interface element may indicate that the name of the link is "Florence-Edward" and that there is a label of "Likes." The line may display "Florence" in one color, e.g., red, and may display "Edward" in a second color, e.g., blue.

The properties may include a name or value of a node. The properties also may include a label or relation associated with the node. In addition, the properties may include one or more links associated with the node. As an example, the node may have a link that links to a left node having a name or value and a right node having a name or value.

In addition, the NetTree application 106 includes a user interface module 214 for displaying the user interface on the display. As an example, the user interface module 214 generates a native and/or web-based graphical user interface (GUI) that accepts input and provides output viewed by users of the client computing device 102. The client computing device 102 may provide realtime automatically and dynamically refreshed information such as a NetTree dashboard user interface that shows a representation of a network tree. The user interface module 214 may send data to other modules of the NetTree application 106 of the server computing device 104, and retrieve data from other modules of the NetTree application 106 of the server computing device 104 asynchronously without interfering with the display and behavior of the user interface displayed by the client computing device 102.

Figure 3:
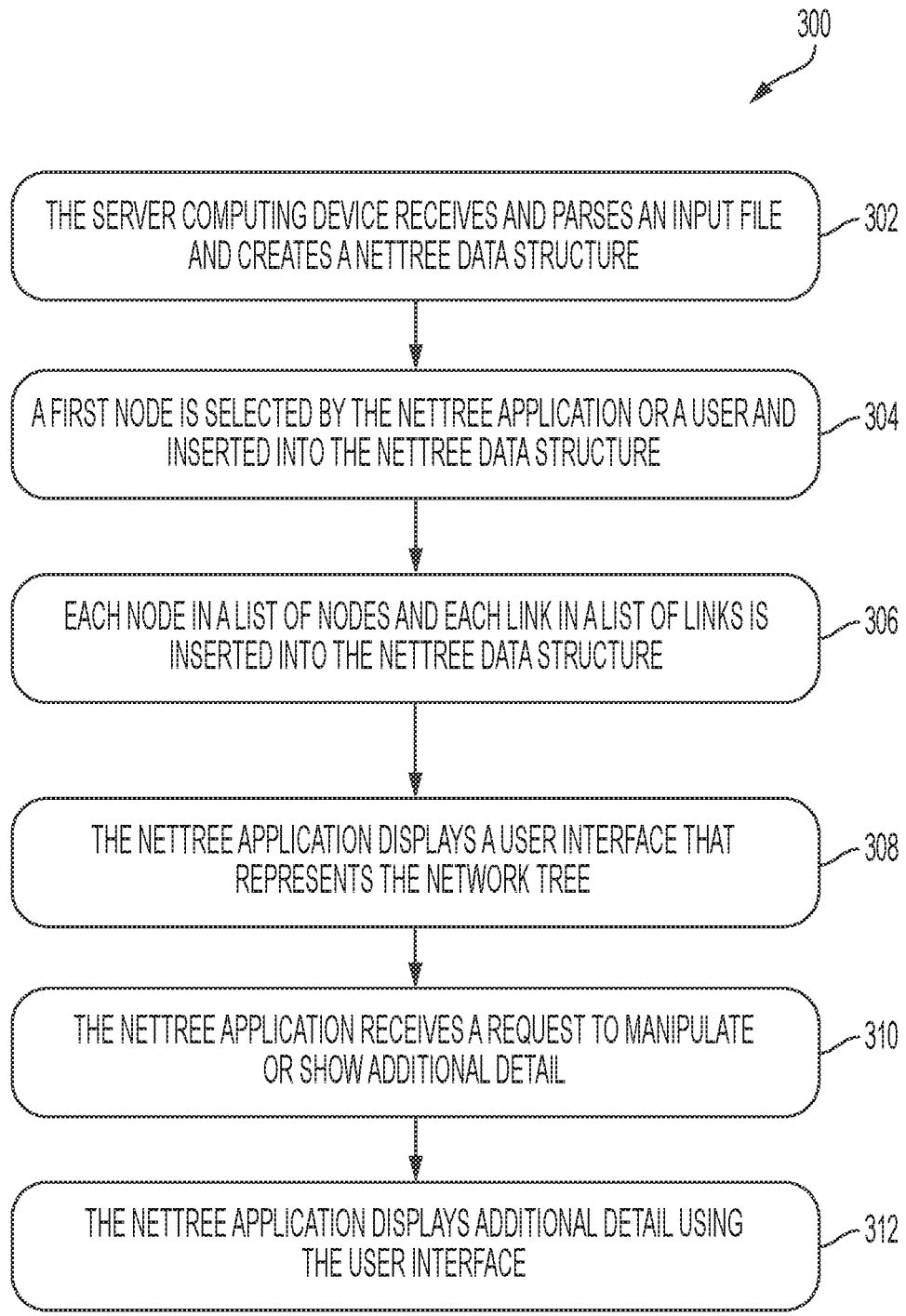
FIG. 3 illustrates a flowchart of a process for visualizing and navigating network tree data according to an example embodiment.

FIG. 3 illustrates a flowchart of a process 300 for visualizing and navigating network tree data according to an example embodiment. In step 302, the server computing device 104 receives input data such as an input file associated with a network. In another example, input may be provided to a graphical user interface that may permit entry into each of the tables of the data structure. As an example, the user may enter the name of a network, properties of the network (or select from a template of network properties), nodes and node properties, and links and link properties. Also, data can be obtained from a graph database such as Neo4j, Maria, and tinkerpop, among others. The input data may be provided by a user of the client computing device 102 using a browser that displays a GUI associated with the NetTree application 106. The NetTree application 106 of the server computing device 104 may create a NetTree data structure based on the input data.

In step 304, the NetTree application 106 may select a first node from a list of nodes in the network. The first node may be randomly selected or the user may select the first node. The first node may be inserted in a network tree. The first node may be a start node for the network tree. In step 306, each node in the list of nodes in the network and each link in a list of links associated with the nodes of the network is inserted into the network tree using the NetTree data structure.

In step 308, the NetTree application 106 may display the GUI including a representation of the network tree on a display of the client computing device 102 using the browser. In step 310, the NetTree application 106 may receive a request from the user of the client computing device 102 to manipulate at least one line of the network tree and/or show additional detail associated with the network tree. As an example, the user of the client computing device 102 may select a user interface element using the GUI. In step 312, the NetTree application 106 may retrieve and display the additional detail as requested by the user of the client computing device 102. The additional details may be displayed by the display of the client computing device 102.

FIG. 4 shows a flowchart 400 showing detail associated with step 306 discussed above according to an example embodiment. In step 402, based on a current level of the network tree, nodes assigned to the current level are checked that have not yet been checked. As an example, the first node that is checked is the start node. Each link including the node assigned to the current level is checked to find instances of the node in the links. In step 404, for each link that includes the node being checked, if the node is a left node in a link, a line is added to the network tree below a current line of the network tree. In step 406, if the left node is a new addition to the network tree, the left node is checked for its links at a next level of the network tree. In step 408, for each link including the node being checked, if the node is a right node in a link, a line is added to the network tree above a current line of the network tree. In step 410, if the right node is a new addition to the network tree, the right node is checked for its links at a next level of the network tree. In step 412, the level of the network tree is incremented by one and a new check begins for the nodes at the next level. The process 400 continues at each level until all links and nodes are in the network tree.

As an example, the NetTree application 106 may determine a list of nodes in a network from the input data and determine the list of links between the list of nodes in the network, set a level equal to zero, select a node from the list of nodes in the network to be a start node of a network tree and insert the start node in a current line of the network tree, and increment the level by one. The NetTree application 106 begins at the start node and checks each link for the start node. Thus, based on the level of the network tree, if there is at least one node in the list of nodes in the network tree at the level of the network tree that has not been checked for each link in the list of links between the nodes in the network having the at least one node, select the at least one node at the level of the network tree that has not been checked for each link in the list of links between the nodes in the network having the at least one node, and check each link in the list of links between the nodes in the network having the at least one node at the level of the network tree that has not been checked for each link in the list of links between the nodes in the network having the at least one node.

Based on the level of the network tree, for each link in the list of links between the nodes in the network having the at least one node, the NetTree application 106 may perform one of inserting the link in a new line below the current line in the network tree when the at least one node is a left node in the link and inserting the link in a new line above the current line in the network tree when the at least one node is a right node in the link. The NetTree application 106 may remove the link from the list of links to add to the network tree.

Additionally, based on the level of the network tree, when the left node of the link is a node that has not been checked for each link in the list of links between the nodes in the network having the at least one node, the NetTree application 106 may check each link in the list of links between the nodes in the network tree having the left node at a next level of the network tree. Additionally, when the right node of the link is a node that has not been checked for each link in the list of links between the nodes in the network having the at least one node, the NetTree application 106 may check each link in the list of links between the nodes in the network tree having the right node at a next level of the network tree. The level is then incremented to the next level. This is repeated until each link of the list of links is added to the tree and each node in the list of nodes is added to the tree.

When creating the network tree, the server computing device 104 may instantiate a data structure such as the NetTree data structure to represent the network tree comprising the list of nodes in the network tree and at least one property associated with each node in the network tree, the list of links between the list of nodes in the network tree and at least one property associated with each link in the network tree, and at least one property associated with the network tree.

Figure 5:
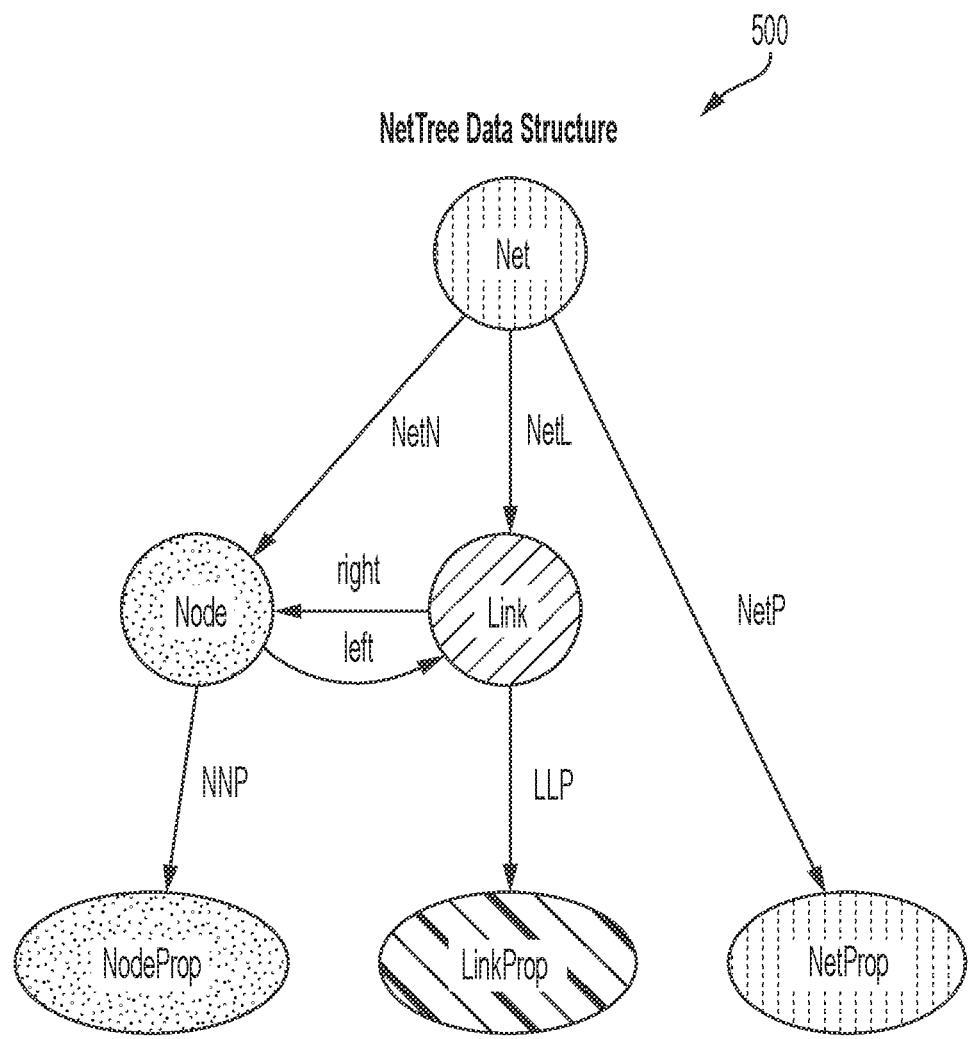
FIG. 5 illustrates an example of a NetTree data structure of the system according to an example embodiment.

FIG. 5 shows an example of a NetTree data structure 500 of the system according to an example embodiment. As shown in FIG. 5, the NetTree data structure 500 represents a network and may include at least one node and at least one link between each node in the network tree. In addition, the NetTree data structure may have at least one property associated with the overall network. Each node may have at least one node property and each link may have at least one link property.

As an example, given a network Net=(N,L,P) where N=(nodeid) is a set of nodes where nodeid uniquely identifies the node, L is a collection of links, and P is a set of properties. A link L=(linkid, LeftNode, RightNode) where linkid uniquely identifies the link, LeftNode and RightNode are in the set N. Property P=(ElementReference, Key, Value) where ElementReference is a pointer to a node or a link or if null the Net itself, Key is a string naming the property and Value is the value of the property.

Figure 6:
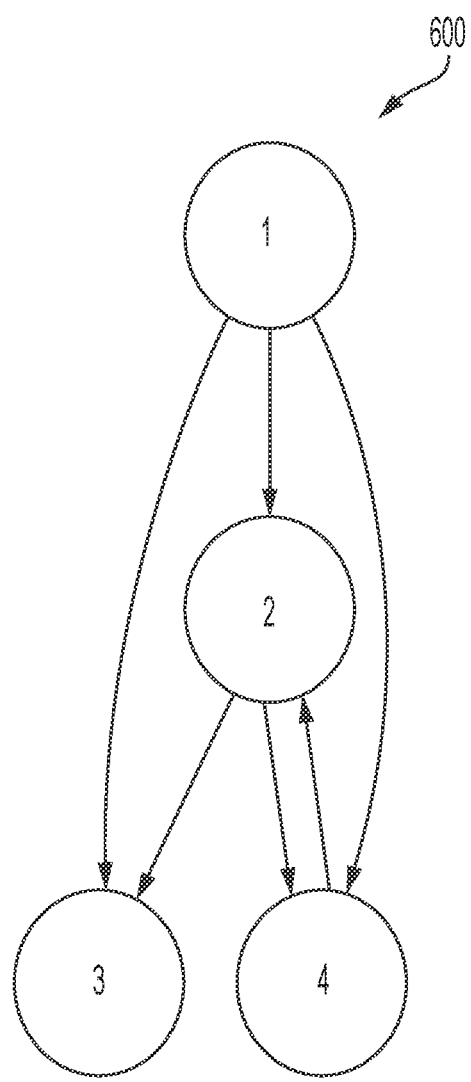
FIG. 6 illustrates an example drawn directed graph diagram according to an example embodiment.

FIG. 6 shows an example drawn directed graph diagram 600 that represents input data according to an example embodiment. As shown in FIG. 6, there are four nodes and links between the four nodes that are illustrated with the arrows. As an example, there is an arrow that points from one to three, an arrow that points from one to two, an arrow that points from two to three, an arrow that points from two to four, an arrow that points from four to two, and an arrow that points from one to four.

Figure 7:
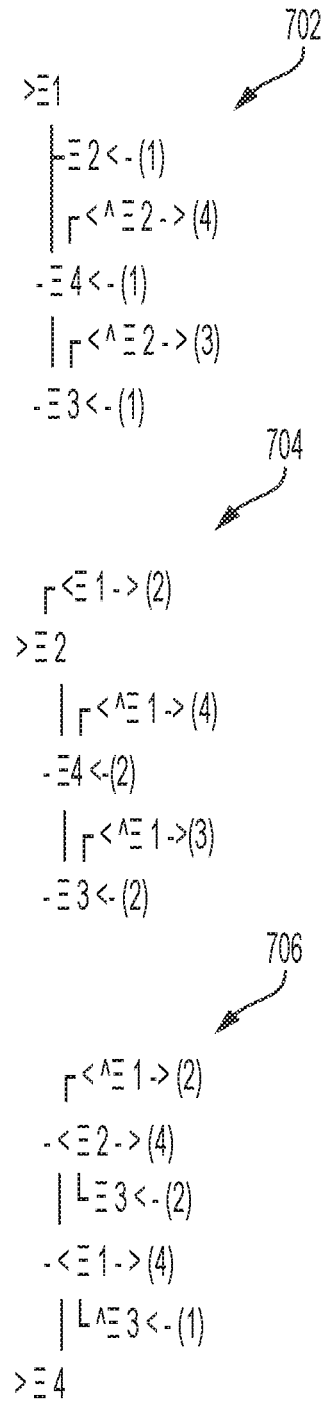
FIG. 7 illustrates an example of a NetTree generated by the system according to an example embodiment.

FIG. 7 shows three different examples of a NetTree generated by the system 100 using the same input data as represented by the drawn directed graph diagram 600 according to an example embodiment. FIG. 7 represents the drawn directed graph diagram 600 in three different ways including a first representation 702, a second representation 704, and a third representation 706. In one example, the network tree may be displayed entirely using Unicode characters as shown in FIG. 7. Each of the first representation 702, the second representation 704, and the third representation 706 has a different start node. In the first representation 702, the start node is the first node. In the second representation 704, the start node is the second node. In the third representation 706, the start node is the fourth node. Each of the first representation 702, the second representation 704, and the third representation 706 shows each node of the network tree and each link between nodes of the network tree on a different line. The start node is shown on its own line.

As shown in FIG. 7, there are icons or characters that are user interface elements found on each line of the network tree. A ">" icon indicates a start node of the network tree. A "≡" icon or triple bar symbol is selectable by a user of the client computing device 102. When the triple bar is selected, additional details and properties may be displayed. An arrow icon "→" or "←" represents a link between two nodes. A "ˆ" or carrot icon indicates that a node appears in at least one other line of the network tree and that the node expands elsewhere. Additionally, the network tree illustrates linkage between different nodes in the network tree. A "|" icon or "⊢" icon between lines of the network tree shows linkage. The linkage also may appear as "⌈" character or "⌊" character as shown in FIG. 7. In other words, The ⌈ and ⌊ and | are line drawing characters and are used to show the linkage or connection to the adjoining line. In addition, the user interface element may be a plus/minus (+/−) user interface element that appears as a plus sign before it is selected and a minus sign when it is selected. When it is selected, additional information including a subset of the network tree may be displayed. When it is not selected, the additional information including the subset of the network tree is hidden.

The first representation 702 includes the following:
The start node for the following NetTree is "1."
>≡1
⊢≡2←(1)
|⌈<ˊ≡2→(4)
−≡4←(1)
|⌈<ˊ≡2→(3)
−≡3←(1)

The second representation 704 includes the following:
The start node for the following NetTree is "2."
⌈<≡1→(2)
>≡2
|⌈<ˊ≡1→(4)
−≡4←(2)
|⌈<ˊ≡1→(3)
−≡3←(2)

The third representation 706 includes the following:
The start node for the following NetTree is "4."
⌈<ˊ≡1→(2)
−<≡2→(4)
||≡3←(2)
−<≡1→(4)
|⌊ˆ≡3←(1)
>≡4

The user of the client computing device 102 may provide a selection of a user interface element using the browser and the server computing device 104 may receive the selection of a user interface element of a line in the network tree. As an example, upon selection of the user interface element, the client computing device 102 may request additional information from the server computing device 104. The user interface element may represent a uniform resource locator (URL) or may represent a file that includes information associated with the line. The client computing device 102 may receive information from the server computing device 104 and display information associated with the line in the network tree. Even further, the client computing device 102 may display a user interface element that indicates that there are viewable details associated with a line in the network tree, receive a selection of the user interface element by the user, and display the viewable details associated with the line in the network tree. The user interface element may be a plus or "+" user interface element that expands a subset of the network tree when the user interface element is selected or may be a "−" or minus a user interface element that contracts a subset of the network tree when the user interface element is selected.

Figure 8:
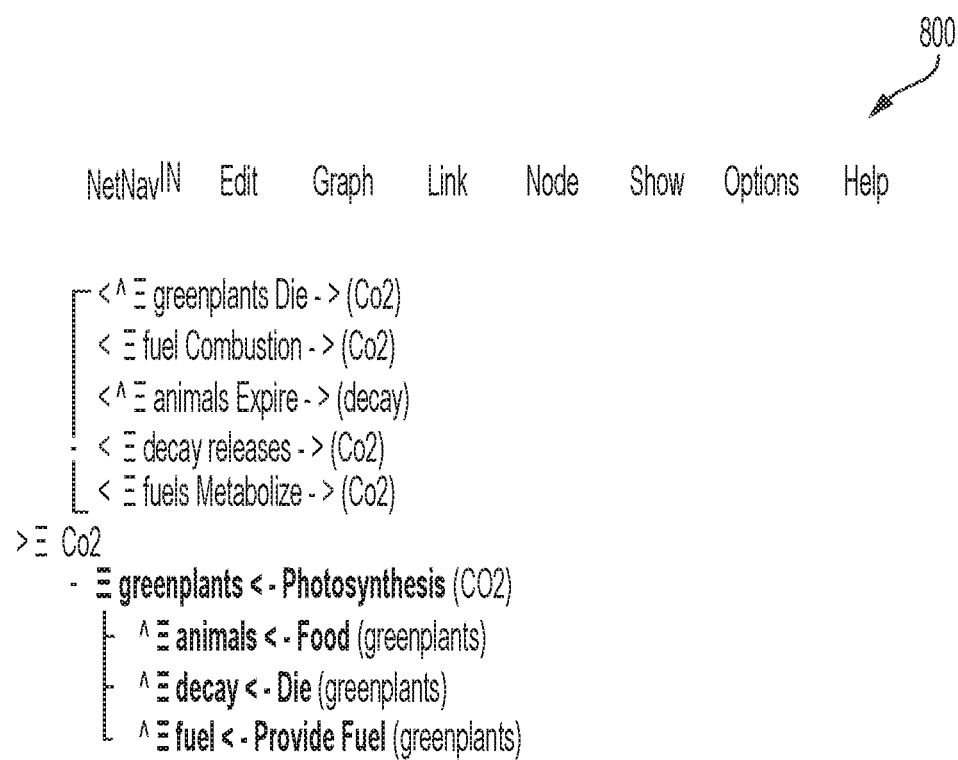
FIG. 8 illustrates an example user interface displayed by a client computing device according to an example embodiment.

FIG. 8 shows an example user interface of the NetTree application 106 displayed by the client computing device 102 according to an example embodiment. As shown in FIG. 8, the user of the client computing device 102 may view a network tree 800 associated with carbon dioxide that is indicated as the start node. As shown in FIG. 8, the network tree 800 is shown using a browser.

As shown in FIG. 8, the user interface includes a toolbar at a top of the user interface including an "Edit" selection option, a "Graph" selection option, a "Link" selection option, a "Node" selection option, a "Show" selection option, an "Options" selection option, and a "Help" selection option.

Figure 9:
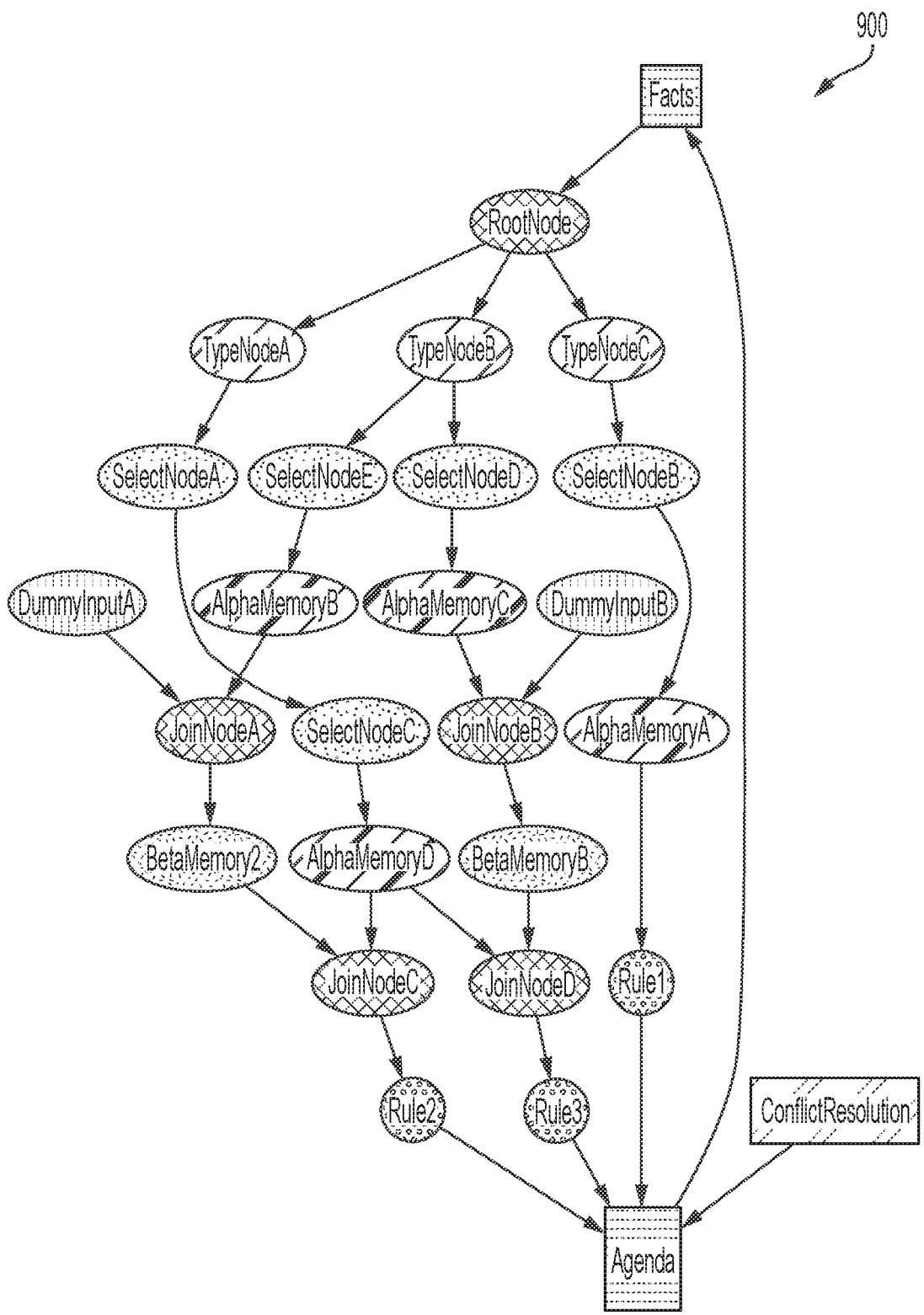
FIG. 9 illustrates an example drawn directed graph representing a general memory layout of a rete used in a rules engine application according to an example embodiment.

FIG. 9 shows a drawn directed graph representing a general memory layout of a rete used in a rules engine application 900 that represents input data according to an example embodiment. As shown in FIG. 9, there are a number of nodes and a number of links between the nodes that are illustrated with the arrows. Unfortunately, the diagram 900 is very difficult to follow and it is difficult to determine what nodes inherit from other nodes.

Figure 10:
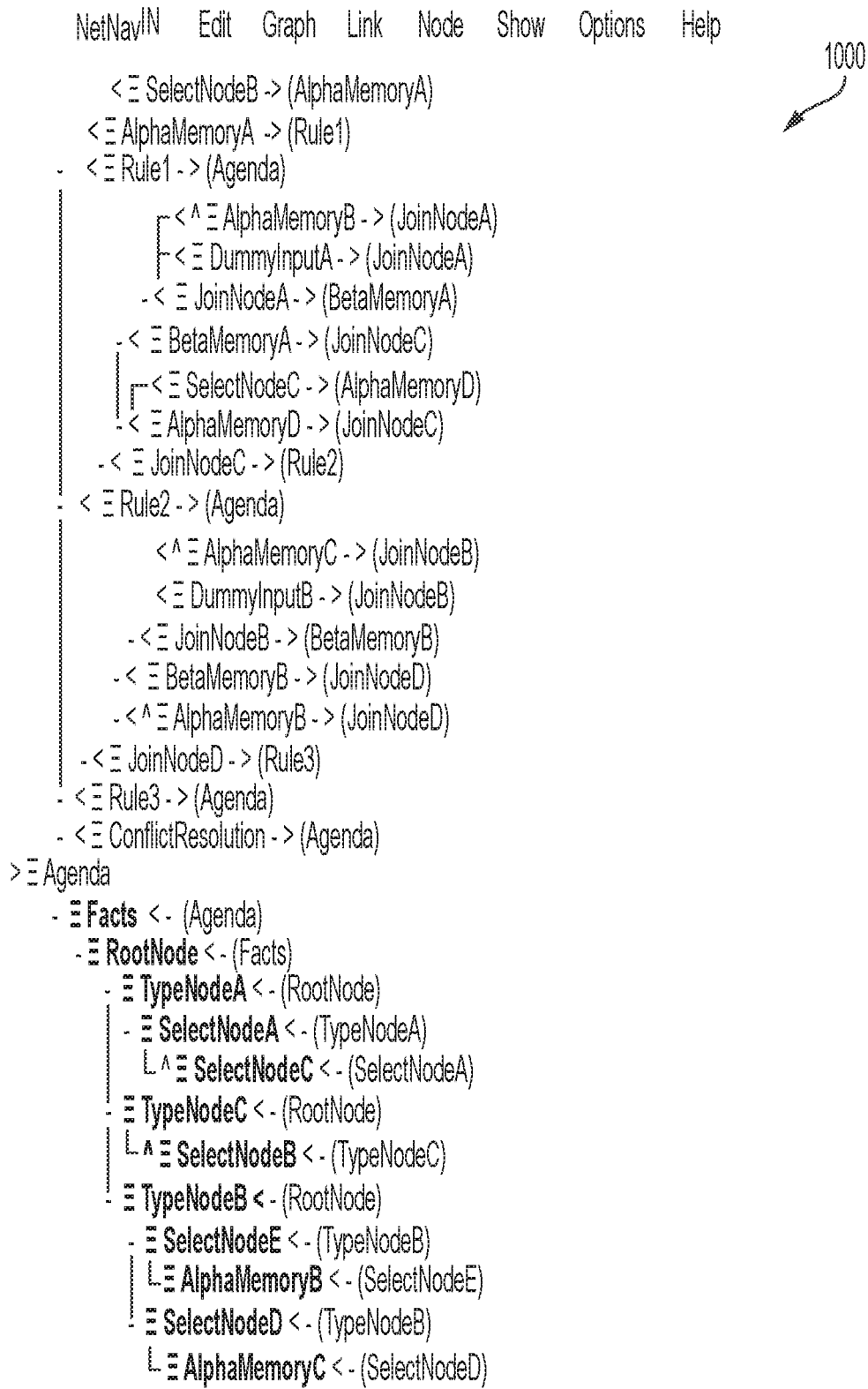
FIG. 10 illustrates an example user interface displayed by the client computing device according to an example embodiment.

FIG. 10 shows an example of a NetTree generated by the system 100 using the same input data of the drawn directed graph diagram 900 according to an example embodiment. FIG. 10 represents the drawn directed graph diagram 900 as a network tree 1000 via an example user interface of the NetTree application 106 displayed by the client computing device 102 according to an example embodiment. As shown in FIG. 10, the network tree 1000 is shown using a browser. As shown in FIG. 10, "Agenda" is the start node.

Figure 11:
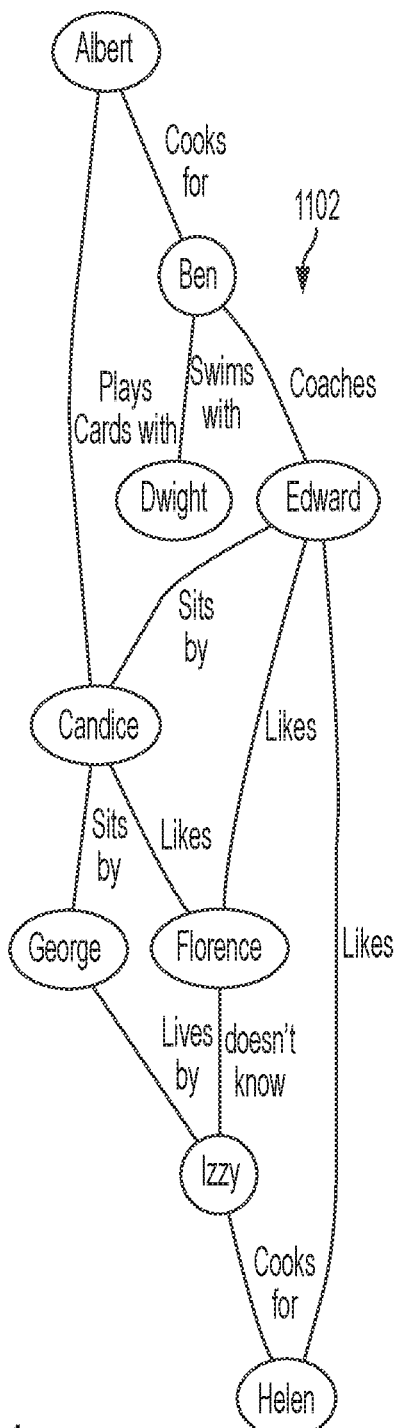
FIG. 11 illustrates a comparison of an example drawn graph diagram and a network tree generated by the system according to an example embodiment.

FIG. 11 shows a comparison of an example drawn graph diagram 1102 and a network tree 1104 generated by the system 100 according to an example embodiment. As shown in FIG. 11, there is a start node "Albert" and a number of other lines including:

Edward→Sits By (Candice)
Candice←Plays Cards with (Albert)
Florence←Likes (Candice)
Izzy←Lives by (Florence)
George←Sits by (Candice)
Izzy←Lives by (George)
Ben←Cooks for (Albert)
Dwight←Swims with (Ben)
Florence→Likes (Edward)
Edward←Coaches (Ben)
Izzy→Cooks for (Helen)
Helen←Likes (Edward)

In an example, the start node may be displayed in one color such as green. In addition, other colors may be used such as black, red, and blue. In one example, each node in the parenthesis may be displayed in blue. In addition, Florence→Likes may be displayed in red and Izzy→Cooks for may be displayed in red. The other text may be displayed in black. Colors are intended to improve readability. As an example, red may indicate the line was placed above the line containing the node that was being considered and blue may be used to show that the line was placed below the line containing the node. A start node may be green. However, colors are user configurable and the formatting of each line can be user configurable.

Figure 12:
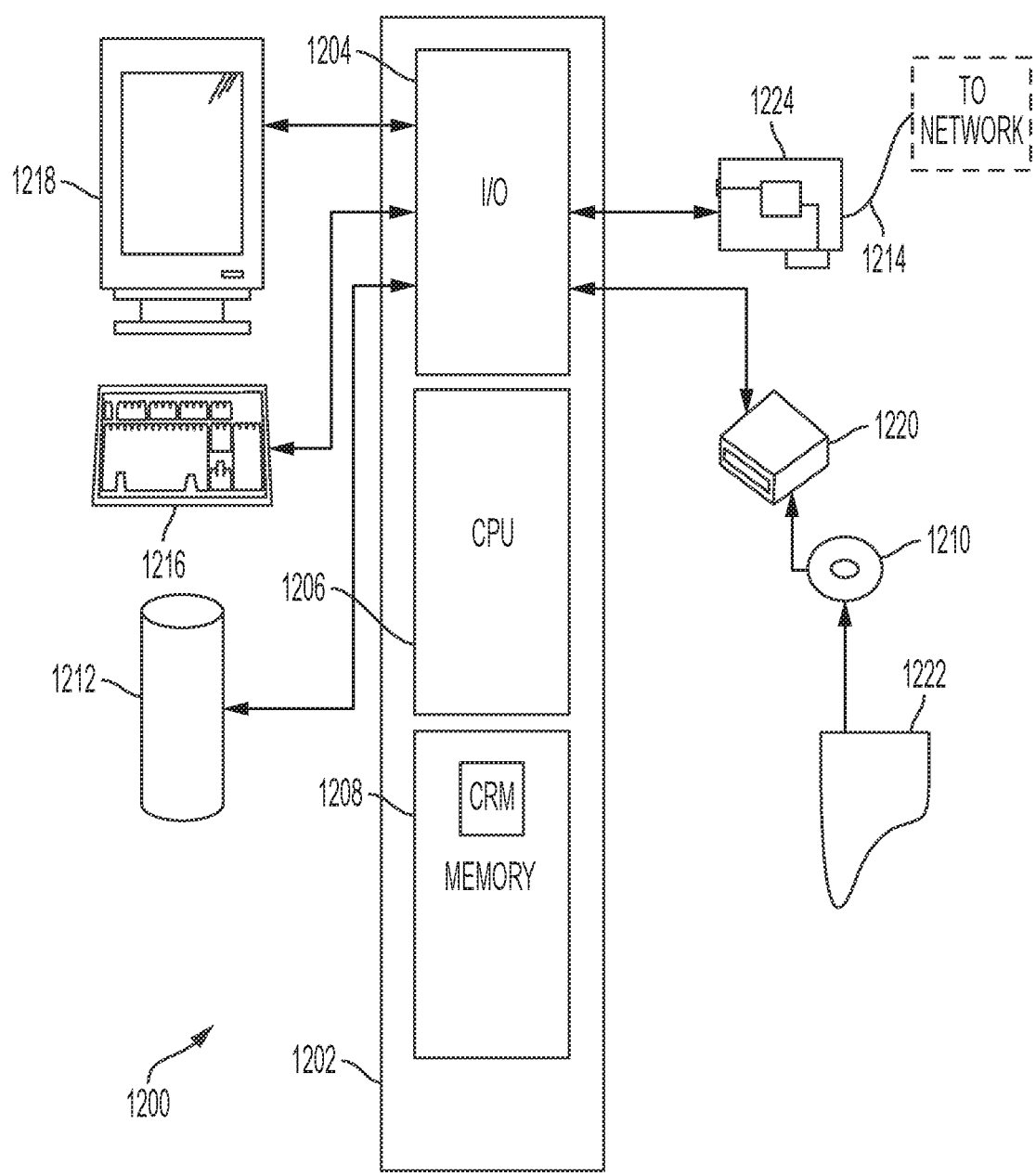
FIG. 12 illustrates a block diagram of a computing device according to an example embodiment.

FIG. 12 illustrates an example computing system 1200 that may implement various systems, such as the client computing device 102 and the server computing device 104, and the methods discussed herein, such as process 300 and process 400. A general purpose computer system 1200 is capable of executing a computer program product to execute a computer process. Data and program files may be input to the computer system 1200, which reads the files and executes the programs therein such as the NetTree application 106. Some of the elements of a general purpose computer system 1200 are shown in FIG. 12 wherein a processor 1202 is shown having an input/output (I/O) section 1204, a central processing unit (CPU) 1206, and a memory section 1208. There may be one or more processors 1202, such that the processor 1202 of the computer system 1200 comprises a single central-processing unit 1206, or a plurality of processing units, commonly referred to as a parallel processing environment. The computer system 1200 may be a conventional computer, a server, a distributed computer, or any other type of computer, such as one or more external computers made available via a cloud computing architecture. The presently described technology is optionally implemented in software devices loaded in memory 1208, stored on a configured DVD/CD-ROM 1210 or storage unit 1212, and/or communicated via a wired or wireless network link 1214, thereby transforming the computer system 1200 in FIG. 12 to a special purpose machine for implementing the described operations.

The memory section 1208 may be volatile media, non-volatile media, removable media, non-removable media, and/or other media or mediums that can be accessed by a general purpose or special purpose computing device. For example, the memory section 1208 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data.

Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1204 is connected to one or more user-interface devices (e.g., a keyboard 1216 and a display unit 1218), a disc storage unit 1212, and a disc drive unit 1220. Generally, the disc drive unit 1220 is a DVD/CD-ROM drive unit capable of reading the DVD/CD-ROM medium 1210, which typically contains programs and data 1222. Computer program products containing mechanisms to effectuate the systems and methods in accordance with the presently described technology may reside in the memory section 1208, on a disc storage unit 1212, on the DVD/CD-ROM medium 1210 of the computer system 1200, or on external storage devices made available via a cloud computing architecture with such computer program products, including one or more database management products, web server products, application server products, and/or other additional software components. Alternatively, a disc drive unit 1220 may be replaced or supplemented by another storage medium drive unit. The network adapter 1224 is capable of connecting the computer system 1200 to a network via the network link 1214, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1200 is connected (by wired connection and/or wirelessly) to a local network through the network interface or adapter 1224, which is one type of communications device. When used in a WAN-networking environment, the computer system 1200 typically includes a modem, a network adapter, or any other type of communications device for establishing communications over the wide area network. In a networked environment, program modules depicted relative to the computer system 1200 or portions thereof, may be stored in a remote memory storage device. It is appreciated that the network connections shown are examples of communications devices for and other means of establishing a communications link between the computers may be used.

In an example implementation, source code executed by the client computing device 102, source code executed by the server computing device 104, a plurality of internal and external databases, source databases, and/or cached data on servers are stored in memory of the client computing device 102, memory of the server computing device 104, or other storage systems, such as the disk storage unit 1212 or the DVD/CD-ROM medium 1210, and/or other external storage devices made available and accessible via a network architecture. The source code executed by the client computing device 102 and the server computing device 104 may be embodied by instructions stored on such storage systems and executed by the processor 1202.

Some or all of the operations described herein may be performed by the processor 1202, which is hardware. Further, local computing systems, remote data sources and/or services, and other associated logic represent firmware, hardware, and/or software configured to control operations of the network tree visualization system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1202 and a user may interact with a Graphical User Interface (GUI) using one or more user-interface devices (e.g., the keyboard 1216, the display unit 1218, and other user-interface devices in communication with the I/O section 1204) with some of the data in use directly coming from online sources and data stores. The system set forth in FIG. 12 is but one possible example of a computer system that may be employed or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a memory; and
at least one processor to execute instructions stored by the memory to:
receive input data comprising one of an input graph or network file, an extensible markup language (XML) representation, input provided to a graphical user interface (GUI), and a graph database, determine a list of nodes in a network from the input data, and determine a list of links between the list of nodes in the network from the input data;
set a level equal to zero, select a node from the list of nodes in the network to be a start node of a network tree and insert the start node in a current line of the network tree, and increment the level by one;
based on the level of the network tree, check each link in the list of links between the nodes in the network having at least one node at the level of the network tree;
based on the level of the network tree, for each link in the list of links between the nodes in the network having the at least one node, perform one of insert the link in a new line below the current line in the network tree when the at least one node is a left node in the link and insert the link in a new line above the current line in the network tree when the at least one node is a right node in the link, and remove the link from the list of links to add to the network tree; and
after adding each link in the list of links between nodes in the network tree, display the network tree in a first representation using Unicode characters and receive a selection of a user interface element that is associated with one or more lines of the network tree and display the network tree in a second representation that is different from the first representation.

2. The system of claim 1, wherein the user interface element comprises an arrow user interface element that indicates that there is a link in a direction of the arrow user interface element.

3. The system of claim 1, wherein the user interface element indicates that there is a node that appears in more than one location in the network tree.

4. The system of claim 1, wherein the user interface element comprises an expansion/contraction user interface element that allows the user to expand and/or contract a subset of the network tree at a particular line.

5. The system of claim 1, wherein the selection of the user interface element is received from a client computing device.

6. The system of claim 1, wherein the user interface element comprises a details user interface element.

7. The system of claim 1,
wherein the network tree is based on:
a network Net=(N,L,P) where N=(nodeid) is a set of nodes where nodeid uniquely identifies the node, L is a collection of links, and P is a set of properties;
a link L=(linkid, LeftNode, RightNode) where linkid uniquely identifies the link, LeftNode and RightNode are in the set N; and Property P=(ElementReference, Key, Value) where ElementReference is a pointer to a node or a link or if null the Net itself, Key is a string naming the property and Value is a value of the property.

8. The system of claim 1, the at least one processor further to display linkage between different nodes in the network tree using at least one of "|", "⊢", "⌈", and "⌊".

9. A method, comprising:
receiving, by at least one processor, input data comprising one of an input graph or network file, an extensible markup language (XML) representation, input provided to a graphical user interface (GUI), and a graph database, determining a list of nodes in a network from the input data, and determining a list of links between the list of nodes in the network from the input data;
setting, by the at least one processor, a level equal to zero, selecting a node from the list of nodes in the network to be a start node of a network tree and inserting the start node in a current line of the network tree, and incrementing the level by one;
based on the level of the network tree, checking, by the at least one processor, each link in the list of links between the nodes in the network having at least one node at the level of the network tree;
based on the level of the network tree, for each link in the list of links between the nodes in the network having the at least one node, performing, by the at least one processor, one of inserting the link in a new line below the current line in the network tree when the at least one node is a left node in the link and inserting the link in a new line above the current line in the network tree when the at least one node is a right node in the link, and removing the link from the list of links to add to the network tree; and
after adding each link in the list of links between nodes in the network tree, displaying, by the at least one processor, the network tree in a first representation using Unicode characters and receiving a selection of a user interface element that is associated with one or more lines of the network tree and displaying the network tree in a second representation that is different from the first representation.

10. The method of claim 9, wherein the user interface element comprises an arrow user interface element that indicates that there is a link in a direction of the arrow user interface element.

11. The method of claim 9, wherein the user interface element indicates that there is a node that appears in more than one location in the network tree.

12. The method of claim 9, wherein the user interface element comprises an expansion/contraction user interface element that allows the user to expand and/or contract a subset of the network tree at a particular line.

13. The method of claim 9, further comprising receiving the selection of the user interface element from a client computing device.

14. The method of claim 9, wherein the user interface element comprises a details user interface element.

15. The method of claim 9,
wherein the network tree is based on:
a network Net=(N,L,P) where N=(nodeid) is a set of nodes where nodeid uniquely identifies the node, L is a collection of links, and P is a set of properties;
a link L=(linkid, LeftNode, RightNode) where linkid uniquely identifies the link, LeftNode and RightNode are in the set N; and
Property P=(ElementReference, Key, Value) where ElementReference is a pointer to a node or a link or if null the Net itself, Key is a string naming the property and Value is a value of the property.

16. The method of claim 9, further comprising displaying linkage between different nodes in the network tree using at least one of "|", "⊢", "⌈", and "⌊".

17. A non-transitory computer-readable storage medium, having instructions stored thereon that, when executed by a computing device cause the computing device to perform operations, the operations comprising:
receiving input data comprising one of an input graph or network file, an extensible markup language (XML) representation, input provided to a graphical user interface (GUI), and a graph database, determining a list of nodes in a network from the input data, and determining a list of links between the list of nodes in the network from the input data;
setting a level equal to zero, selecting a node from the list of nodes in the network to be a start node of a network tree and inserting the start node in a current line of the network tree, and incrementing the level by one;
based on the level of the network tree, checking each link in the list of links between the nodes in the network having at least one node at the level of the network tree;
based on the level of the network tree, for each link in the list of links between the nodes in the network having the at least one node, performing one of inserting the link in a new line below the current line in the network tree when the at least one node is a left node in the link and inserting the link in a new line above the current line in the network tree when the at least one node is a right node in the link, and removing the link from the list of links to add to the network tree; and
after adding each link in the list of links between nodes in the network tree, displaying the network tree in a first representation using Unicode characters and receiving a selection of a user interface element that is associated with one or more lines of the network tree and displaying the network tree in a second representation that is different from the first representation.

18. The non-transitory computer-readable storage medium of claim 17,
wherein the network tree is based on:
a network Net=(N,L,P) where N=(nodeid) is a set of nodes where nodeid uniquely identifies the node, L is a collection of links, and P is a set of properties;
a link L=(linkid, LeftNode, RightNode) where linkid uniquely identifies the link, LeftNode and RightNode are in the set N; and
Property P=(ElementReference, Key, Value) where ElementReference is a pointer to a node or a link or if null the Net itself, Key is a string naming the property and Value is a value of the property.

* * * * *